United States Patent [19]

Krueger et al.

[11] Patent Number: 4,729,371
[45] Date of Patent: Mar. 8, 1988

[54] RESPIRATOR COMPRISED OF BLOWN BICOMPONENT FIBERS

[75] Inventors: Dennis L. Krueger, Hudson; James F. Dyrud, New Richmond, both of Wis.

[73] Assignee: Minnesota Mining and Manufacturing Company, St. Paul, Minn.

[21] Appl. No.: 911,394

[22] Filed: Sep. 25, 1986

Related U.S. Application Data

[60] Division of Ser. No. 704,537, Feb. 22, 1985, abandoned, which is a continuation of Ser. No. 540,543, Oct. 11, 1983, abandoned.

[51] Int. Cl.$^4$ ............................ A62B 7/00; D02G 3/00
[52] U.S. Cl. ............................ 128/206.19; 428/296; 428/374; 428/359; 428/362; 428/372
[58] Field of Search .............. 428/288, 296, 373, 374, 428/362, 224, 372, 359, 360, 401, 229, 280; 156/167, 180; 128/206.19

[56] References Cited

U.S. PATENT DOCUMENTS

| | | | |
|---|---|---|---|
| 3,016,599 | 1/1962 | Perry | 28/78 |
| 3,333,585 | 8/1967 | Barghini et al. | 128/212 |
| 3,571,679 | 3/1971 | van Turnhout | 317/262 |
| 3,595,731 | 7/1971 | Davies et al. | 428/296 |
| 3,692,618 | 9/1972 | Dorschner et al. | 161/72 |
| 3,755,527 | 8/1973 | Keller et al. | 156/167 X |
| 3,895,151 | 7/1975 | Matthews et al. | 156/167 X |
| 3,949,130 | 4/1976 | Sabee | 156/167 X |
| 3,971,373 | 7/1976 | Braun | 128/146 |
| 4,118,534 | 10/1978 | Stanley | 428/370 |
| 4,195,112 | 3/1980 | Sheard et al. | 428/288 |
| 4,210,690 | 7/1980 | Hartmann et al. | 428/95 |
| 4,215,682 | 8/1980 | Kubik et al. | 128/205 |
| 4,217,387 | 8/1980 | Viezee et al. | 156/167 X |
| 4,238,175 | 12/1980 | Fujii et al. | 156/167 X |
| 4,419,993 | 12/1983 | Peterson | 128/206.19 |
| 4,426,417 | 1/1984 | Meitner et al. | 428/296 |
| 4,454,881 | 1/1984 | Huber et al. | 128/206.19 |

FOREIGN PATENT DOCUMENTS

| | | | |
|---|---|---|---|
| 57-35053 | 2/1982 | Japan . | |
| 932482 | 7/1963 | United Kingdom | 428/296 |
| GB2096048A | 10/1982 | United Kingdom . | |

OTHER PUBLICATIONS

Wente, Van A., "Superfine Thermoplastic Fibers", in *Industrial Engineering Chemistry*, vol. 48, pp. 1342 et seq. (1956).
Report No. 4364 Naval Research Laboratories, May 25, 1954, "Manufacture of Superfine Organic Fibers", by Wente, V. A.; Boone, C. D.; and Fluharty, E. L.
Buntin, Robert A. and Lohkamp, Dwight D., "Melt-Blown-A One-Step Process for New Non-Woven Products", *TAPPI*, vol. 56, No. 4, Apr. 1973.
Excerpt fm *Encyclopedia of Textiles, Fibers and Non-Woven Fabrics*, 1984, John Wiley and Sons, Inc., pp. 252-284 (part p. 273), on subject of "Non-Woven Textile Fabrics".
Yoshito Miura, "Key Points of Non-Woven Fabrics", published on Mar. 15, 1981.
S. C. Yu, "Manufacturing Techniques of Non-Woven Fabrics", 1st edition, Jan. 1978.
*Encylcopedia of Polymer Sciences and Technology*, vol. 8, p. 221.
39-Textiles, vol. 85, p. 71, 1976.

*Primary Examiner*—Lorraine T. Kendell
*Attorney, Agent, or Firm*—Donald M. Sell; James A. Smith; Roger R. Tamte

[57] ABSTRACT

Fibrous webs of bicomponent fibers are made by extruding a layered molten mass through a row of side-by-side orifices into a high-velocity gaseous stream. Bicomponent fibers of small size can be obtained, and the webs offer unique properties.

8 Claims, 5 Drawing Figures

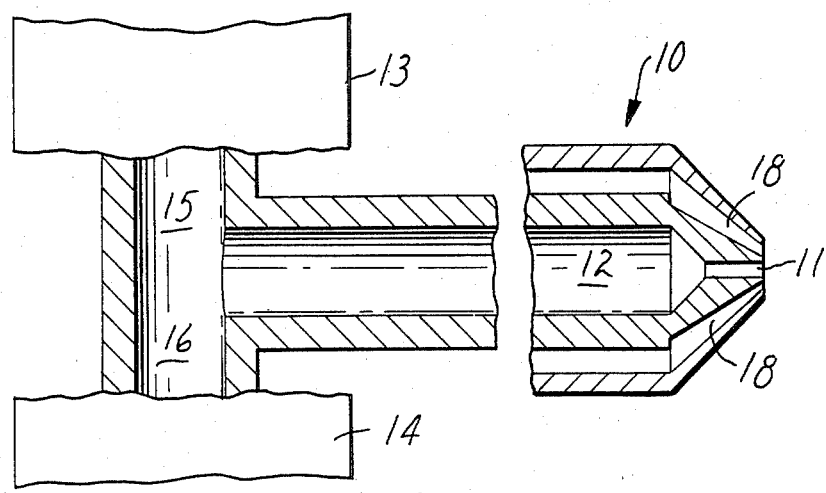
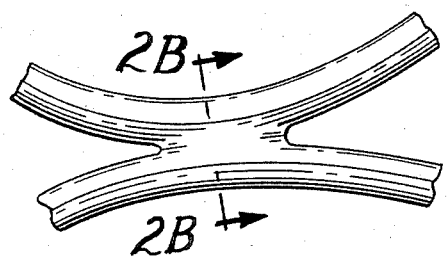
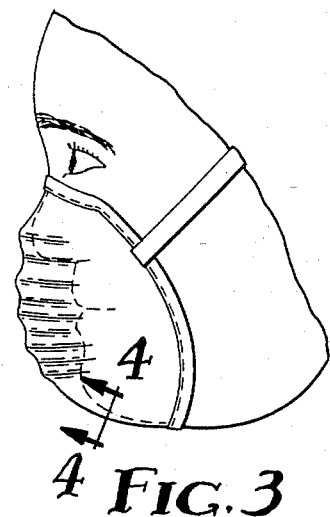
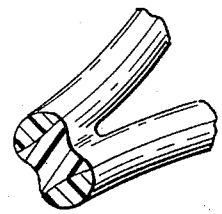
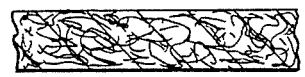
FIG. 1
FIG. 2A
FIG. 3
FIG. 2B
FIG. 4

RESPIRATOR COMPRISED OF BLOWN BICOMPONENT FIBERS

This is a division of application Ser. No. 704,537, filed Feb. 22, 1985, which itself is a continuation of application Ser. No. 540,543, filed Oct. 11, 1983, both applications now being abandoned.

BACKGROUND OF THE INVENTION

Bicomponent fibers have been prepared and commercially marketed for several years in standard textile sizes, e.g., with cross-sectional diameters of at least about 15 micrometers. One characteristic of such fibers is that the components of the fibers tend to split longitudinally, e.g., upon cooling after exit from the spinneret, or when subjected to a thermal shock. Such a splitting is sometimes regarded as useful (see U.S. Pat. No. 4,118,534), but other times has the disadvantage of lessening the strength of the fiber or taking away properties intended to be achieved by the bicomponent nature of the fibers.

DISCLOSURE OF INVENTION

The present invention provides new fibrous webs comprising bicomponent blown fibers, preferably averaging less than 10 micrometers in diameter, which have a reduced tendency to split apart and which provide unique web properties. These fibers are prepared by simultaneous feeding of different polymeric materials in molten form to the same die cavity of a fiber-blowing apparatus, where the materials form a lavered liquid mass, and extruding the layered mass through a row of side-by-side orifices into a high velocity gaseous stream. The portions of material extruded through each die orifice are attenuated and drawn into fibers by the high-velocity gaseous stream, and are then carried to a collector such as a moving screen, where the mass of fibers is deposited as a coherent entangled web. Surprisingly the layered liquid mass presented to the individual side-by-side orifices passes through these orifices without undue turbulence or disruption, with the layered structure being maintained in the individual extruded streams, and the layered individual streams are then drawn into bicomponent microfibers in the high-velocity gaseous stream.

Briefly summarized, the fibrous web collected by the above procedure comprises a coherent entangled mass of blown fibers that preferably average less than 10 micrometers in diameter, the individual blown fibers comprising a first polymeric material extending longitudinally along the fiber through a first portion of the cross-sectional area of the fiber and a second polymeric material adhered to the first polymeric material and extending longitudinally along the fiber through a second portion of the cross-sectional area of the fiber.

The collected web exhibits a number of unique properties. Webs loftier than conventional blown fiber webs can be obtained, because the bicomponent fibers tend to be curly, e.g., as a result of differences in shrinkage during cooling for the different components of the fibers. Further, these lofty webs have unique filtration characteristics, with lower pressure drops than conventional blown fiber webs, coupled with higher filtration efficiencies. Also, the side-by-side presence of different polymeric materials in individual blown fibers appears to offer other unique properties as discussed below.

The collected bicomponent webs can be processed in ways not possible with previous blown fiber webs to produce novel products. For example, webs made from fibers comprising components that soften at different temperatures allow novel formation of the webs into molded shapes, such as a cup shape used in disposable molded masks or respirators. A particularly unique example is a web in which the fibers comprise an amorphous but crystallizable material such as polyethylene terephthalate as one component (polyethylene terephthalate can be obtained in the amorphous form in melt-blown fibers) and a thermosoftening polymer such as polypropylene as a second component. When the collected web is molded or conformed in the presence of heat, the amorphous polyethylene terephthalate first crystallizes at a temperature lower than the softening point of the polypropylene, whereupon the polyethylene terephthalate assumes a melting point higher than the melting point of the polypropylene. The temperature of the web can then be further elevated above the softening point of the polypropylene, whereupon the fibers become bonded at their points of intersection by coalescence of the polypropylene at those points of intersection. The crystallized polyethylene terephthalate serves as a supporting network during this softening process, whereby the web retains its porosity and fibrous nature, while the fibers become bonded together so that after cooling the web retains its molded shape.

DESCRIPTION OF THE DRAWINGS

FIG. 1 is a schematic diagram of apparatus used in practicing the present invention;

FIG. 2 is a greatly enlarged sectional view of a fiber intersection in a portion of a web of the invention; and FIGS. 3 and 4 show a representative face mask that incorporates a web of blown bicomponent fibers of the present invention, FIG. 3 being a perspective view showing the mask in use, and FIG. 4 being a sectional view along the lines 4—4 of FIG. 3.

DETAILED DESCRIPTION

A representative apparatus useful for preparing a web or sheet product of the invention is shown schematically in FIG. 1. Part of the apparatus for forming blown fibers is described in Wente, Van A., "Superfine Thermoplastic Fibers" in *Industrial Engineering Chemistry*, Vol. 48, p. 1342 et seq. (1956), or in Report No. 4364 of the Naval Research Laboratories, published May 25, 1954, entitled "Manufacture of Superfine Organic Fibers," by Wente, V. A.; Boone, C. D.; and Fluharty, E. L. This portion of the illustrated apparatus comprises a die 10 which has a set of aligned side-by-side parallel die orifices 11, one of which is seen in the sectional view through the die. The orifices 11 open from a central die cavity 12.

In the illustrated embodiment of the invention two different polymeric components are introduced into the die cavity 12 through extruders 13 and 14 and conduits 15 and 16. In the die cavity 12 the components form a layered mass (i.e., a mass in which the different components are segregated as discrete layers), which is extruded through the side-by-side orifices 11. Orifices 18 are disposed on either side of the row of orifices 11 for conveying heated air at a very high velocity. The air draws out and attenuates the extruded polymeric material into a mass of fibers, which solidifies after a short travel in the gaseous stream. The solidified fibers travel to a collector, which may take the form of a finely perforated cylindrical screen or drum, or a moving belt, where they are collected as a coherent entangled web. The collected web of fibers can then be removed from the collector and wound in a storage roll. Gas-withdrawal apparatus may be positioned behind the collector to assist in deposition of fibers and removal of gas.

Although the illustrative apparatus shown in FIG. 1 has a single undivided die cavity into which two different polymeric materials are introduced, in different embodiments a separator plate is included in the die cavity to keep the polymeric materials separate until immediately prior to reaching the exit area of the orifices. However, even without such a separator plate, and whether or not the die is arranged horizontally as shown in FIG. 1 or vertically, the different polymeric materials or components pass through the orifices as layered streams without being disrupted by turbulence or because of different specific gravities, and bicomponent fibers are formed. The viscosities of the different polymeric materials being passed through a die should be generally similar, which can be achieved by controlling the temperature and residence time in the extruder, composition of the polymeric material, etc.

The extruded bicomponent fibers are not always arranged as semi-cylinders. For example, a first component may be disposed more in the center of the fiber, with a second component wrapped partially or completely around the first component. In the latter case the first component becomes a core area and the second component becomes a sheath. More than two different polymeric materials may be included in the fibers, e.g., as separate layers, and the term "bicomponent" is used herein to include fibers that have more than two components. The components generally extend continuously along the length of the fiber.

The blown fibers are preferably microfibers, averaging less than about 10 micrometers in diameter, since the components in such fibers are more strongly adhered. Also fibers of that size offer improved filtration efficiency and other beneficial properties. Very small fibers, averaging less than 5 or even 1 micrometer in diameter, may be blown, but larger fibers, e.g., averaging 25 micrometers or more in diameter, may also be blown, and are useful for certain purposes such as coarse filter webs.

Other fibers may be mixed into a fibrous web of the invention, e.g., by feeding the fibers into the stream of blown fibers before they reach a collector. U.S. Pat. No. 4,118,531 teaches such a process for introducing crimped staple fibers which increase the loft of the collected web, and U.S. Pat. No. 3,016,599 teaches such a process for introducing uncrimped fibers. The additional fibers can also have the function of opening or loosening the web, of increasing the porosity of the web, and of providing a gradation of fiber diameters in the web. The most useful results have been obtained by including staple fibers in amounts up to about 90 volume percent, with the amount preferably being less than about 50 volume percent. Also particulate matter may be introduced into the web in the manner disclosed in U.S. Pat. No. 3,971,373, e.g., to provide enhanced filtration, and the particles may be bonded to the fibers, e.g., by controlling process conditions during web formation or by later heat treatments or molding operations.

Blown fibrous webs are characterized by an extreme entanglement of the fibers, which provides coherency and strength to a web and also adapts the web to contain and retain other materials, such as particulate materials or other fibers. The aspect ratio (ratio of length to diameter) of blown fibers is essentially infinite (e.g., generally at least about 10,000 or more), though the fibers have been reported to be discontinuous. The fibers are long and entangled sufficiently that it is generally impossible to remove one complete fiber from the mass of fibers or to trace one fiber from beginning to end.

A completed web or sheet product of the invention may vary widely in thickness. For most uses, webs having a thickness between about 0.05 and 5 centimeters are used. For some applications, two or more separately formed webs may be assembled as one thicker sheet product. Also webs of the invention may be prepared by depositing the stream of fibers onto another sheet material such as a porous nonwoven web which is to form part of the completed web. Other structures, such as impermeable films, can be laminated to a sheet product of the invention through mechanical engagement, heat bonding, or adhesives.

Webs of the invention may be further processed after collection, e.g., compacting through heat and pressure to control sheet caliper, to give the web a pattern or to increase the retention of particulate materials.

The fibers may be formed from a wide variety of fiber-forming materials. Representative combinations of polymeric materials for the components of a fiber include: polyethylene terephthalate and polypropylene; polyethylene and polypropylene; polyethylene terephthalate and linear polyamides such as nylon 6; polybutylene and polypropylene; and polystyrene and polypropylene. Also, different materials may be blended to serve as one component of a bicomponent fiber. In addition, blown fibers of different combinations of materials may be used in the same web either in mixture in one layer (e.g., by collecting a mixture of fibers from two dies) or in different layers.

The polymeric components in a two-component bicomponent fiber of the invention are most often included in approximately the same volume amounts, or in amounts ranging between about 40 and 60 volume percent for each of the components, but can vary outside that range.

As previously indicated, a particularly useful combination of components in bicomponent fibers of the invention includes a first, crystallizable, component such as amorphous polyethylene terephthalate and a second, thermosoftening, component such as crystalline polypropylene or amorphous polystyrene. Although polyethylene terephthalate fibers prepared by typical spinneret drawing inherently tend to be crystalline, blown polyethylene terephthalate fibers tend to be amorphous (because of the rapid quenching effect of the air stream that attenuates and transports the fibers). When a web comprising blown fibers that contain amorphous polyethylene terephthalate is placed in a mold and heated to a temperature higher than the temperature at which the polyethylene terephthalate becomes crystalline, the polyethylene terephthalate-containing fibers first assume the shape in which they are pressed by the mold and then after the heating process, retain that shape because of their newly crystallized state. If the crystallizing temperature to which the web is heated is lower than the temperature at which the second component of the fibers softens, as is the case with polypropylene, the second component provides a fibrous support in which the first component is intimately and continuously supported over its length, thus helping to maintain the individual fibers as discrete fibers, rather than allowing the web to collapse or coalesce to a film-like condition. The polyethylene terephthalate softens as it is heated to the crystallizing temperature, and some bonding occurs between fibers at intersections where the polyethylene terephthalate component of one fiber engages the polyethylene terephthalate component of another fiber or fiber segment.

Crystallization of the polyethylene terephthalate raises the softening point of the polyethylene terephthalate, and in fact, the softening point is raised past the softening point of the polypropylene. The result is that the web then can be heated to a higher temperature, past the softening point of the polypropylene, with the polyethylene terephthalate component now providing a fibrous support that prevents the web from collapsing or coalescing. Also, during molding operations the web is surprisingly inhibited from sticking to the mold parts, which can occur with webs of fibers that consist wholly of polypropylene. Bonds are formed between fibers where polypropylene components engage. A well-bonded molded web is formed which durably retains its shape.

Other crystallizable polymeric materials such as other polyesters and polyamides can also be obtained in an amorphous form in blown fibers, e.g., by the quenching effect of the process air or by spraying water onto the fibers as they travel to the collector, to give the fibers the described moldable character.

FIGS. 2a and 2b illustrate a representative fiber intersection in a web of the invention, with FIG. 2a showing an exterior view of the fibers, and 2b showing a cross-section through the fibers at their point of intersection.

FIG. 3 shows a perspective view of a cup-shaped face mask or respirator formed from a fibrous web of the invention, and FIG. 4 is a cross-section through the web. An advantage of the invention is that a web of the invention may be used as the sole sheet product of the face mask, as shown in FIG. 4, rather than sandwiching a web of blown microfibers between two molded fibrous webs which serve as the exterior and interior of the web, and hold the blown microfiber web in the cup-like shape of the face mask or respirator. Lofty low-pressure-drop masks or other molded products may be prepared because bonding between fibers and shaping of the web occurs readily through the combination of properties offered by the bicomponent fibers, such as the noted crystallizability and shapeability of polyethylene terephthalate fibers and the fusability of polypropylene heated to its softening point.

Webs of the invention may be electrically charged to enhance their filtration capabilities, as by introducing charges into the fibers as they are formed, in the manner described in U.S. Pat. No. 4,215,682, or by charging the web after formation in the manner described in U.S. Pat. No. 3,571,679. Polypropylene is desirably included as a component in electrically charged fibers of the invention because it retains a charged condition well. Bicomponent fibers of the invention offer the benefit of including polypropylene together with another component that provides other useful properties.

Another advantage of bicomponent fibers of the invention is that a first material which is more susceptible to melt-blowing, e.g., because of viscosity and flow characteristics, can be used as one component with another material that is less susceptible to melt-blowing as a second component to obtain well-formed bicomponent fibers with both materials extending continuously over the length of the fiber.

Fibrous webs of the invention may include other ingredients in addition to the microfibers. For example, fiber finishes may be sprayed onto a web to improve the hand and feel of the web. Additives, such as dyes, pigments, fillers, abrasive particles, light stabilizers, fire retardants, absorbents, medicaments, etc., may also be added to webs of the invention by introducing them to the fiber-forming liquid of the microfibers, spraying them on the fibers as they are formed after the web has been collected, etc.

The invention will be additionally illustrated by the following examples. The examples report measured values for the quality of filtration for dioctylphthalate aerosols, which were measured by using an Air Techniques Inc. 0127 DOP Penetrometer. This instrument thermally generates a monodispersed 0.3 micrometer diameter dioctylphthalate particle at a concentration of 100 micrograms per liter of air and presents the particle-containing stream to the test web at a rate of 32 liters per minute and a face velocity of 5.2 centimeters per second. The quality of filtration index is equal to the negative natural logarithm of the fraction of penetration through the fibrous web divided by the pressure drop through the web in millimeters of water. The higher the quality of filtration index, the better.

EXAMPLE 1

Preparation of Fibrous Web

A fibrous web was prepared using apparatus as shown in FIG. 1 and forming the fibers from polyethylene terephthalate having an intrinsic viscosity of 0.59 and polypropylene having a melt flow of 35. The extruder for the polyethylene terephthalate had a screw diameter of 1 inch (2.54 centimeters) and a length to diameter ratio of 25. The extruder for the polypropylene had a screw diameter of 1½ inches (3.8 centimeters) and a length-to-diameter ratio of 25. The first extruder elevated the temperature of the polyethylene terephthalate through a temperature profile of 400°, 510°, and 600° F. (204°, 266°, and 316° C.), and the polyethylene terephthalate reached the die with a temperature of 615° F. (323° C.). The second extruder elevated the temperature of the polypropylene through a temperature profile of 350°, 450° and 500° F. (177°, 232°, and 260° C.), and the polypropylene and a temperature of 490° F. (254° C.) upon reaching the die. The polyethylene terephthalate introduced into the extruder had first been dried in a desiccant dryer for three hours at 350° F. (177° C.).

The two polymers were introduced into the die cavity in an amount sufficient to provide about 50 weight-percent polyethylene terephthalate and 50 weight-percent polypropylene, and were extruded through the die orifices 11 at a rate of about one pound per hour per inch width of die (0.18 kilogram per hour per centimeter). The die had about 55 orifices 11 per inch width (22 per centimeter). Air heated to 750° F. (400° C.) was forced through the air orifices 18 of the dies at a rate of 20 cubic feet per minute at 20 pounds per square inch (0.57 cubic meter per minute at a pressure of 1.4 kilograms per square centimeter). Different zones of the die were heated to different temperatures, the first zone (i.e., including the die orifices) being heated to 600° F. (315° C.), and the rear zone being heated to 570° F. (300° C.).

Bicomponent blown fibers were collected on a screen-type collector which was spaced about 38 centimeters from the die and was moving at a rate of 3 meters/minute. The collected web weighted about 101 grams per square meter and was about 5 millimeters in thickness. When tested at a face velocity of 32 liters per minute, the web exhibited a pressure drop of about 0.1 millimeter water.

The collected fibers had an average diamter of 4 micrometers. The two components extended continuously along the length of the fibers, and in cross-section were arranged generally as semi-cylinders.

A web as prepared was sectioned by cutting with a razor blade and examined under a microscope, and it was found that the fibers of the web remained intact. By contrast, when a web of 30 micrometer-diameter fibers of the same two components prepared in a spinneret was cut in the same manner, the fibers tended to split apart.

EXAMPLE 2

Example 1 was repeated with several samples being made from the described polymeric components: in sample A the fibers comprised 70 weight-percent polypropylene and 30 weight-percent polyethylene terephthalate; in sample B the fibers comprised equal weight amounts of polypropylene and polyethylene terephthalate; and in sample C the fibers comprised 30 weight-percent polypropylene and 70 weight-percent polyethylene terephthalate. For comparative purposes two comparative samples M and N were prepared, comparative sample M comprising fibers that consisted only of polypropylene and comparative sample N comprising fibers that consisted only of polyethylene terephthalate. The dioctylphthalate filtration quality indexes measured for the different samples were 0.58 for sample A, 1.39 for sample B, and 1.0 for sample C. Comparative sample M exhibits an index of 0.25 and comparative sample N, 0.5.

EXAMPLE 3

A web was prepared with equipment and process conditions as described in Example 1 using as the polymeric components polypropylene like that used in Example 1 and a nylon-6 polyamide having a medium viscosity (No. 523 supplied by Foster Grant). The extruder for the polypropylene had a temperature profile of 350°, 400°, 450° and 500° F. (177°, 205°, 232°, and 260° C.) and the polypropylene had a temperature of 550° F. (288° C.) upon reaching the die. The extruder for the nylon had a temperature profile of 350°, 450°, 550°, and 650° F. (177°, 232°, 288°, and 343° C.) and the nylon had a temperature of 650° F. (343° C.) upon reaching the die. Two samples were prepared, sample A including 70 weight-percent polypropylene and 30 weight-percent nylon in the fibers, and sample B including equal parts of the polypropylene and nylon. For comparative purposes another web was prepared in which the fibers comprised 100% of the stated nylon. The dioctylphthalate filtration quality index was 0.99 for sample A, 0.93 for sample B, and 0.19 for the comparative sample made from fibers that comprised only nylon.

EXAMPLE 4

A web of bicomponent fibers was made using the apparatus described in Example 1 and using as the polymeric components the polypropylene described in Example 1 and a general purpose clear polystyrene. The extruder for the polystyrene elevated the temperature of the polystyrene through a temperature profile of 350°, 450°, 600° F. (177°, 232°, and 316° C.) and the other extruder elevated the temperature of the polypropylene through the same temperature profile. A coherent handleable web was collected comprising bicomponent fibers of polystyrene and polypropylene.

EXAMPLE 5

Molding of fibrous web of Example 1

Fibrous web as described in Example 1 was placed between the mating parts of a cup-shaped cast aluminum mold. The top, or female, half of the mold was heated to 210° F. (98° C.), and the male, or bottom, half to 195° F. (90° C.), and the web was left in the mold for 3 seconds. Upon removal from the mold the web retained its molded shape. By viewing the web under a polarizing light microscope, it was determined that the polyethylene terephthalate portions of the fibers had become crystallized, and that some bonding between fibers had occurred at points of engagement by polyethylene terephthalate portions of the fibers.

The molded web was then heated in an air oven for 60 seconds to a temperature of about 170° C. Upon re-examination of the web under a microscope it was seen that polypropylene portions of the fibers at points of intersection of the fibers had fused or coalesced together, and to a lesser extent there were bonds between polyethylene terephthalate portions of the fibers at points of intersection. In other words, the heating in the air oven had given the molded web further permanence of the molded shape, i.e., had further "heat-set" the molded web into its molded shape.

The effects of heating the molded webs in an air oven to different temperatures were examined with a series of tests. Flat webs were first heated for about 5 minutes at 250° F. (121° C.) to crystallize the polyethylene terephthalate portion of the fibers, thereby simulating the conditions that occur during the molding operation described above. The webs were then exposed in an air oven to the temperatures listed in Table I, described as heat-setting temperatures. The degree of shape-retention was indicated by subjecting the web to compression and measuring the change in thickness of the web. The original thickness of the web before molding was 1.6 centimeters, measured while the web was under a pressure of 2.3 grams per square centimeter to provide a standard measure of thickness. The molded, heat-set web was then compressed by applying a total pressure of 7 grams per square centimeter to the web. The percent compression was equal to the initial thickness minus the final thickness divided by the initial thickness, with the quotient being multiplied by 100 to obtain percent. The percent compression obtained for different heat-setting temperatures is given in Table I.

TABLE I

| Heat-Setting Temperature | | Percent Compression |
|---|---|---|
| (°F.) | (°C.) | (Percent) |
| 250 | 121 | 32.5 |
| 275 | 135 | 23.5 |
| 300 | 149 | 24 |
| 325 | 163 | 21 |
| 350 | 177 | 6 |
| 400 | 204 | 7.3 |

The above experiments indicate that significant heat-setting or additional bonding of fibers in the web occurs and at a temperature between 325° and 350° F. (163° and 177° C.), which is about equal to the melting point of polypropylene, and which indicates that the fibers are being bonded at their intersection points by coalescence of the polypropylene.

EXAMPLE 6

A fibrous web was prepared by mixing 60 weight-percent bicomponent fibers prepared in the manner described in Example 1 with 40 weight-percent polyethylene terephthalate macrofibers (15-denier fibers having lengths of about 1¼ inches (3.2 centimeters), with 6.5±1 crimps per inch (2.5±0.4 crimps/centimeter). The web was prepared by introducing the macrofibers from a lickerin roll into the blown fiber stream in the manner described in U.S. Pat. No. 4,118,531. The resulting web, which had a basis weight of 250 grams per square meter, was molded in a mold as described in Example 5 using a temperature of 275° F. (135° C.) for the top half of the mold and a temperature of 210° F. (98° C.) for the bottom half. The sample was left in the mold for 26⅔ seconds and the mold parts were pressed together at a pressure of 8 pounds per square inch. The molded web was heat set by heating in a forced air oven for one minute at 350° F. (177° C.).

The sample exhibited a dioctylphthalate filtration quality index of 2.8.

Compression tests were performed on the various samples of the product of this example. At 50 grams loading, which equaled 0.89 gram per square centimeter pressure, the web as made exhibited a thickness reduction of 12%, and at 150 grams loading exhibited a thickness reduction of 41%. After the web was heat set at 275° F. (135° C.) for five minutes the web exhibited a thickness reduction of 8% at 50 grams loading and 25% at 150 grams loading. When heated a second time at 350° F. (176° C.) for one minute, the web exhibited a thickness reduction of 5% at 50 grams loading and 16% at 150 grams loading.

EXAMPLE 7

A fibrous web was prepared that comprised a mixture of (a) 80 weight-percent of bicomponent fibers made from 50 weight-percent polypropylene and 50 weight-percent of a high-density polyethylene having a melt index of 42 and a density of 0.96, and (b) 20 weight-percent of macrofibers which were bicomponent and comprised a polypropylene core almost entirely sheathed by polyethylene (ES Fibers supplied by Chisso Corporation). Both the polyethylene and polypropylene in the fibers were crystalline, but they had different melting points. Different webs were made using staple fibers of different denier: sample A used 1.5 denier fibers; sample B used 5 denier fibers; sample C used 15 denier fibers and sample D used 18 denier fibers. The webs were heated in an oven at 290° F. (145° C.) for 1-5 minutes. Scanning electron microscopic examination of the web showed good welding between the fibers in all of the samples.

EXAMPLE 8

A web was prepared with equipment and process conditions as described in Example 3 using as the first polymeric components polypropylene like that used in Example 1 and as the second component a 95/5 weight-percent blend of a medium-viscosity nylon-6 polyamide (No. 523 supplied by Foster Grant) and an amorphous polypropylene having a ring and ball softening point of 310° F. (154° C.) (No. 900EP AFAX supplied by Hercules). The extruder temperatures were the same as those used in Example 3. Three samples were prepared, Sample A including 70 weight-percent of the first component and 30 weight-percent of the second blended component, sample B including equal parts of the two components, and sample C including 30 weight-percent of the first component and 70 weight-percent of the second component.

The dioctylphthalate filtration quality index was 1.10 for sample A, 1.16 for sample B and 1.05 for sample C and 0.39 for a comparative sample made from fibers that comprised only the second, or a blend, component.

EXAMPLE 9

A web was prepared as described in Example 1. A rectangular sample of this web measuring 5 cm by 10 cm and weighing 0.52 gms was placed into a circulating hot air oven at 275° F. (135° C.) for 1 minute to crystallize the PET component. The web was then placed in a container with 20 gms of 320 grit aluminum oxide abrasive granules, and the container placed into a circulation hot air oven at 350° F. (176° C.) for about 5 minutes. The container was then rapidly shaken while hot. The final web had a weight of 1.28 gms. Light micrographs showed the aluminum oxide abrasive to be adhered in the web to the polypropylene side of the microfibers.

What is claimed is:

1. A respirator comprising a fibrous web molded to a cup shape adapted to cover the mouth and nose of a person wearing the respirator, the fibrous web comprising a coherent entangled mass of blown bicomponent fibers which individually comprise a first polymeric material extending longitudinally along the fiber through a first portion of the cross-sectional area of the first fiber and a second polymeric material adhered to the first polymeric material and extending longitudinally along the fiber through a second portion of the cross-sectional area of the fiber, said fibers being prepared by extruding a layered molten mass of said first and second polymeric materials through a row of side-by-side orifices into a high-velocity gaseous stream, where the extruded streams are attenuated and drawn into a mass of entangled fibers having an essentially infinite aspect ratio.

2. A respirator of claim 1 in which the blown fibers average no more than about 10 micrometers in diameter.

3. A respirator of claim 1 further comprising staple fibers interspersed with the blown fibers.

4. A respirator of claim 3 in which the staple fibers are crimped.

5. A respirator of claim 2 further comprising crimped staple fibers interspersed with the blown fibers.

6. A respirator of claim 1 in which the fibrous web is bonded into a shape-retaining form by coalescence of said polymeric material at points of fiber intersection.

7. A respirator of claim 1 in which the fibers of the fibrous web carry an electric charge.

8. A respirator of claim 1 further comprising particulate material dispersed in the fibrous web.

* * * * *